(12) United States Patent
Marin et al.

(10) Patent No.: US 7,514,509 B2
(45) Date of Patent: *Apr. 7, 2009

(54) CATALYST COMPOSITIONS AND METHODS OF FORMING ISOTACTIC POLYPROYPLENE

(75) Inventors: Vladimir P. Marin, Houston, TX (US); Abbas Razavi, Mons (BE)

(73) Assignee: Fina Technology, Inc., Houston, TX (US)

( * ) Notice: Subject to any disclaimer, the term of this patent is extended or adjusted under 35 U.S.C. 154(b) by 7 days.

This patent is subject to a terminal disclaimer.

(21) Appl. No.: 11/305,704

(22) Filed: Dec. 16, 2005

(65) Prior Publication Data

US 2007/0142578 A1 Jun. 21, 2007

(51) Int. Cl.
*C08F 4/76* (2006.01)
*C08F 4/64* (2006.01)

(52) U.S. Cl. ............... 526/170; 526/160; 526/126; 526/351

(58) Field of Classification Search ........... 526/170, 526/126, 352, 160, 943, 53
See application file for complete search history.

(56) References Cited

U.S. PATENT DOCUMENTS

| | | | |
|---|---|---|---|
| 5,308,817 A | 5/1994 | Reddy et al. | |
| 5,416,228 A * | 5/1995 | Ewen et al. | 556/7 |
| 5,449,651 A | 9/1995 | Reddy | |
| 6,121,182 A * | 9/2000 | Okumura et al. | 502/152 |
| 6,362,298 B2 | 3/2002 | Dolle | |
| 6,376,418 B1 | 4/2002 | Shamshoum | |
| 6,515,086 B1 * | 2/2003 | Razavi | 526/160 |
| 6,579,962 B1 | 6/2003 | Wheat et al. | |
| 6,683,150 B1 | 1/2004 | Meverden | |
| 6,693,153 B2 * | 2/2004 | Miller et al. | 526/127 |
| 7,081,493 B2 * | 7/2006 | Kawai et al. | 524/505 |
| 7,094,938 B1 * | 8/2006 | Marin et al. | 585/27 |
| 7,335,711 B2 * | 2/2008 | Marin et al. | 526/160 |
| 2006/0270812 A1 * | 11/2006 | Tohi et al. | 526/127 |
| 2007/0015946 A1 * | 1/2007 | Marin et al. | 585/462 |
| 2007/0043183 A1 * | 2/2007 | Marin et al. | 526/127 |
| 2008/0097052 A1 * | 4/2008 | Marin et al. | 526/126 |

FOREIGN PATENT DOCUMENTS

JP 7-2935 * 1/1995
WO WO2005/100410 * 10/2005

OTHER PUBLICATIONS

JP 7-2935 (translation and abstract in English).*

* cited by examiner

*Primary Examiner*—Vasu Jagannathan
*Assistant Examiner*—Rip A. Lee
(74) *Attorney, Agent, or Firm*—Diane L. Kilpatrick-Lee; Tenley R. Krueger

(57) ABSTRACT

Olefin polymerization processes are described herein. In one embodiment, the process generally includes introducing propylene monomer to a reaction zone, disposing an isospecific metallocene catalyst within the reaction zone, wherein the isospecific metallocene catalyst has the formula:

$$(SiR^A{}_2)(CpR^B{}_4)(FluR^C{}_8)MA_n$$

wherein Si is silicon and is a structural bridge between Cp and Flu, Cp is a cyclopentadienyl group, Flu is a fluorenyl group, M is a transition metal, A is a leaving group, n is an integer equal to the valence of M minus 2, $R^A$ is independently selected from hydrogen, alkyls, aromatics and combinations thereof, $R^B$ is independently selected from hydrogen, alkyls and combinations thereof and $R^C$ is independently selected from hydrogen, alkyls, aromatics and combinations thereof, contacting the propylene monomer with the isospecific metallocene catalyst to form isotactic polypropylene and recovering the isotactic polypropylene from the reaction zone.

15 Claims, No Drawings

CATALYST COMPOSITIONS AND METHODS OF FORMING ISOTACTIC POLYPROYPLENE

FIELD

Embodiments of the present invention generally relate to isospecific metallocene catalyst and polymers produced therewith.

BACKGROUND

As reflected in the patent literature, it is known that different stereoisomers of a given catalyst produce polymers having different stereochemistry. For example, an isomer of a metallocene catalyst may produce atactic polypropylene, while another isomer of the catalyst may produce syndiotactic polypropylene. There has been significant effort expended at forming isospecific metallocene catalysts capable of forming isotactic polypropylene. However, such isotactic polypropylene generally has a lower melting temperature than desired.

Therefore, it is desirable to develop an isospecific metallocene catalyst capable of producing isotactic polypropylene having a high melting point.

SUMMARY

Embodiments of the present invention include olefin polymerization processes. In one embodiment, the process generally includes introducing propylene monomer to a reaction zone, disposing an isospecific metallocene catalyst within the reaction zone, wherein the isospecific metallocene catalyst has the formula:

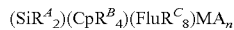

wherein Si is silicon and is a structural bridge between Cp and Flu, Cp is a cyclopentadienyl group, Flu is a fluorenyl group, M is a transition metal, A is a leaving group, n is an integer equal to the valence of M minus 2, $R^A$ is independently selected from hydrogen, alkyls, aromatics and combinations thereof, $R^B$ is independently selected from hydrogen, alkyls and combinations thereof and $R^C$ is independently selected from hydrogen, alkyls, aromatics and combinations thereof, contacting the propylene monomer with the isospecific metallocene catalyst to form isotactic polypropylene and recovering the isotactic polypropylene from the reaction zone.

In another embodiment, the process generally includes contacting propylene monomer with an isospecific metallocene catalyst having a silicon bridge to form isotactic polypropylene and recovering the isotactic polypropylene, wherein the isotactic polypropylene exhibits a melting temperature that is higher than an isotactic polypropylene polymerized under identical conditions with the isospecific metallocene catalyst having a carbon bridge.

DETAILED DESCRIPTION

Introduction and Definitions

A detailed description will now be provided. Each of the appended claims defines a separate invention, which for infringement purposes is recognized as including equivalents to the various elements or limitations specified in the claims. Depending on the context, all references below to the "invention" may in some cases refer to certain specific embodiments only. In other cases it will be recognized that references to the "invention" will refer to subject matter recited in one or more, but not necessarily all, of the claims. Each of the inventions will now be described in greater detail below, including specific embodiments, versions and examples, but the inventions are not limited to these embodiments, versions or examples, which are included to enable a person having ordinary skill in the art to make and use the inventions when the information in this patent is combined with available information and technology.

Various terms as used herein are shown below. To the extent a term used in a claim is not defined below, it should be given the broadest definition persons in the pertinent art have given that term as reflected in printed publications and issued patents. Further, unless otherwise specified, all compounds described herein may be substituted or unsubstituted and the listing of compounds includes derivatives thereof.

The term "activity" generally refers to the weight of product produced per weight of the catalyst used in a process per hour of reaction at a standard set of conditions (e.g., grams product/gram catalyst/hr).

The term "substituted" refers to an atom, radical or group replacing hydrogen in a chemical compound.

The term "homogenous polymerization" refers to polymerization via contact with a catalyst that is present within the reaction system in the same phase as the reactants (e.g., a catalyst in solution within a liquid phase reaction.)

The term "tacticity" refers to the arrangement of pendant groups in a polymer. For example, a polymer is "atactic" when its pendant groups are arranged in a random fashion on both sides of the chain of the polymer. In contrast, a polymer is "isotactic" when all of its pendant groups are arranged on the same side of the chain and "syndiotactic" when its pendant groups alternate on opposite sides of the chain.

As used herein, "isotacticity" is measured via $^{13}C$ NMR spectroscopy using meso pentads and is expressed as percentage of meso pentads (% mmmm). As used herein, the term "meso pentads" refers to successive methyl groups located on the same side of the polymer chain.

As used herein, "molecular weight distribution" is the ratio of the weight average molecular weight to the number average molecular weight (Mw/Mn) of a polymer.

As used herein, "melting temperature" is measured by differential scanning calorimetry (Perkin-Elmer DSC 7).

Embodiments of the invention generally include contacting an olefin monomer with a metallocene catalyst to form a polyolefin.

Catalyst Systems

Metallocene catalysts may be characterized generally as coordination compounds incorporating one or more cyclopentadienyl (Cp) groups (which may be substituted or unsubstituted, each substitution being the same or different) coordinated with a transition metal through π bonding.

The substituent groups on Cp may be linear, branched or cyclic hydrocarbyl radicals, for example. The cyclic hydrocarbyl radicals may further form other contiguous ring structures, including indenyl, azulenyl and fluorenyl groups, for example. These contiguous ring structures may also be substituted or unsubstituted by hydrocarbyl radicals, such as $C_1$ to $C_{20}$ hydrocarbyl radicals, for example.

Embodiments of the invention generally include a bridged metallocene catalyst, for example, described by the general formula:

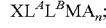

wherein $L^A$ and $L^B$ each denote a bulky ligand generally including a cyclopentadienyl group (Cp) or a derivative thereof, X is a structural bridge between the $L^A$ and the $L^B$, M is a transition metal, A is a leaving group and n is an integer equal to the valence of M minus 2.

Ligand $L^A$ is generally a substituted cyclopentadienyl group. The ligand $L^A$ may have any number and/or placement of substituent groups capable of producing the desired polymer product. $L^A$ substituent groups may be the same or different and may include hydrogen radicals, alkyls (e.g., methyl, ethyl, propyl, butyl (e.g., tert-butyl,) pentyl, hexyl, fluoromethyl, fluoroethyl, difluroethyl, iodopropyl, bromohexyl, benzyl, phenyl, methylphenyl, tert-butylphenyl, chlorobenzyl, dimethylphosphine and methylphenylphosphine), alkenyls (e.g., 3-butenyl, 2-propenyl and 5-hexenyl), alkynyls, cycloalkyls (e.g., cyclopentyl and cyclohexyl), aryls (e.g., trimethylsilyl, trimethylgermyl, methyldiethylsilyl, acyls, aroyls, tris(trifluoromethyl)silyl, methylbis(difluoromethyl)silyl and bromomethyldimethylgermyl), alkoxys (e.g., methoxy, ethoxy, propoxy and phenoxy), aryloxys, alkylthiols, dialkylamines (e.g., dimethylamine and diphenylamine), alkylamidos, alkoxycarbonyls, aryloxycarbonyls, carbomoyls, alkyl- and dialkyl-carbamoyls, acyloxys, acylaminos, aroylaminos, organometalloid radicals (e.g., dimethylboron), Group 15 and Group 16 radicals (e.g., methylsulfide and ethylsulfide) and combinations thereof, for example. In a specific embodiment, ligand $L^A$ includes a cyclopentadienyl group, wherein the Cp group is substituted in the 3 position with a tert-butyl group. In such an embodiment, the ligand $L^A$ may or may not have further substitution.

Ligand $L^B$ generally includes a fluorenyl group, which may be substituted or unsubstituted. When substituted, $L^B$ substituent groups may be the same or different and generally include hydrogen radicals, alkyls (e.g., methyl, ethyl, propyl, butyl (e.g., tert-butyl,) pentyl, hexyl, fluoromethyl, fluoroethyl, difluroethyl, iodopropyl, bromohexyl, benzyl, phenyl, methylphenyl, tert-butylphenyl, chlorobenzyl, dimethylphosphine and methylphenylphosphine), alkenyls (e.g., 3-butenyl, 2-propenyl and 5-hexenyl), alkynyls, cycloalkyls (e.g., cyclopentyl and cyclohexyl), aryls (e.g., trimethylsilyl, trimethylgermyl, methyldiethylsilyl, acyls, aroyls, tris(trifluoromethyl)silyl, methylbis(difluoromethyl)silyl and bromomethyldimethylgermyl), alkoxys (e.g., methoxy, ethoxy, propoxy and phenoxy), aryloxys, alkylthiols, dialkylamines (e.g., dimethylamine and diphenylamine), alkylamidos, alkoxycarbonyls, aryloxycarbonyls, carbomoyls, alkyl- and dialkyl-carbamoyls, acyloxys, acylaminos, aroylaminos, organometalloid radicals (e.g., dimethylboron), Group 15 and Group 16 radicals (e.g., methylsulfide and ethylsulfide) and combinations thereof, for example. In a specific embodiment, ligand $L^B$ includes a fluorenyl group, wherein the Fl group is substituted in the 3 and the 6 positions. In another embodiment, the Fl group is substituted in the 2 and the 7 positions, for example.

The bridging group "X" generally includes silicon, which may or may not be substituted. The bridging group may also contain substituent groups as defined above including halogen radicals, alkyl groups and aromatic groups, for example. More particular non-limiting examples of bridging groups are represented by $R_2Si=$, $—Si(R)_2Si(R_2)—$, where R is independently selected from hydrides, hydrocarbyls, halocarbyls, hydrocarbyl-substituted organometalloids, halocarbyl-substituted organometalloids, disubstituted boron atoms, disubstituted Group 15 atoms, substituted Group 16 atoms and halogen radicals, for example.

Other non-limiting examples of bridging groups include dimethylsilyl, diethylsilyl, methyl-ethylsilyl, trifluoromethylbutylsilyl, bis(trifluoromethyl)silyl, di(n-butyl)silyl, di(n-propyl)silyl, di(i-propyl)silyl, di(n-hexyl)silyl, dicyclohexylsilyl, diphenylsilyl, cyclohexylphenylsilyl, t-butylcyclohexylsilyl, di(t-butylphenyl)silyl and di(p-tolyl) silyl, for example.

The metal atom "M" of the metallocene catalyst compound, as described throughout the specification and claims, may be selected from Groups 3 through 12 atoms and lanthanide Group atoms, or from Groups 3 through 10 atoms or from Sc, Ti, Zr, Hf, V, Nb, Ta, Mn, Re, Fe, Ru, Os, Co, Rh, Ir and Ni, for example. The oxidation state of the metal atom "M" may range from 0 to +7 or is +1, +2, +3, +4 or +5, for example. The groups bound the metal atom "M" are such that the compounds described below in the formulas and structures are electrically neutral, unless otherwise indicated. In a specific embodiment, M is selected from zirconium, hafnium, titanium and vanadium.

Each leaving group "A" is independently selected and may include any ionic leaving group, such as halogens (e.g., chloride and fluoride), hydrides, $C_1$ to $C_{12}$ alkyls (e.g., methyl, ethyl, propyl, phenyl, cyclobutyl, cyclohexyl, heptyl, tolyl, trifluoromethyl, methylphenyl, dimethylphenyl and trimethylphenyl), $C_2$ to $C_{12}$ alkenyls (e.g., $C_2$ to $C_6$ fluoroalkenyls), $C_6$ to $C_{12}$ aryls (e.g., $C_7$ to $C_{20}$ alkylaryls), $C_1$ to $C_{12}$ alkoxys (e.g., phenoxy, methyoxy, ethyoxy, propoxy and benzoxy), $C_6$ to $C_{16}$ aryloxys, $C_7$ to $C_{18}$ alkylaryloxys and $C_1$ to $C_{12}$ heteroatom-containing hydrocarbons and substituted derivatives thereof, for example. In a specific embodiment, A is selected from halogens.

Other non-limiting examples of leaving groups include amines, phosphines, ethers, carboxylates (e.g., $C_1$ to $C_6$ alkylcarboxylates, $C_6$ to $C_{12}$ arylcarboxylates and $C_7$ to $C_{18}$ alkylarylcarboxylates), dienes, alkenes (e.g., tetramethylene, pentamethylene, methylidene), hydrocarbon radicals having from 1 to 20 carbon atoms (e.g., pentafluorophenyl) and combinations thereof, for example. In one embodiment, two or more leaving groups form a part of a fused ring or ring system.

Illustrative, non-limiting examples of metallocene catalyst components consistent with the description herein include dimethylsilane(3-tert-butyl-cyclopentadienyl)(3,6-di-tert-butyl-fluorenyl)$MA_n$ and dimethylsilane(3-tert-butyl-cyclopentadienyl)(2,7-diphenyl-3,6-di-tert-butylfluorenyl), for example.

The catalysts may be formed by any suitable method. For illustration purposes, a variety of non-limiting examples of catalyst synthesis are shown in the Examples.

The metallocene catalysts may be activated with a metallocene activator for subsequent polymerization. As used herein, the term "metallocene activator" is defined to be any compound or combination of compounds, supported or unsupported, which may activate a single-site catalyst compound (e.g., metallocenes, Group 15 containing catalysts, etc.) This may involve the abstraction of at least one leaving group (A group in the formulas/structures above, for example) from the metal center of the catalyst component. The metallocene catalysts are thus activated towards olefin polymerization using such activators.

Embodiments of such activators include Lewis acids, such as cyclic or oligomeric polyhydrocarbylaluminum oxides, non-coordinating ionic activators "NCA", ionizing activators, stoichiometric activators, combinations thereof or any other compound that may convert a neutral metallocene catalyst component to a metallocene cation that is active with respect to olefin polymerization.

The Lewis acids may include alumoxane (e.g., "MAO"), modified alumoxane (e.g., "TIBAO") and alkylaluminum compounds, for example. Non-limiting examples of aluminum alkyl compounds may include trimethylaluminum, triethylaluminum, triisobutylaluminum, tri-n-hexylaluminum and tri-n-octylaluminum, for example.

Ionizing activators are well known in the art and are described by, for example, Eugene You-Xian Chen & Tobin J. Marks, Cocatalysts for Metal-Catalyzed Olefin Polymerization: Activators, Activation Processes, and Structure-Activity Relationships 100(4) CHEMICAL REVIEWS 1391-1434 (2000). Examples of neutral ionizing activators include Group 13 tri-substituted compounds, in particular, tri-substituted boron, tellurium, aluminum, gallium and indium compounds and mixtures thereof (e.g., tri(n-butyl)ammonium, tetrakis(pentafluorophenyl)boron and/or trisperfluorophenyl boron metalloid precursors), for example. The substituent groups may be independently selected from alkyls, alkenyls, halogen, substituted alkyls, aryls, arylhalides, alkoxy and halides, for example. In one embodiment, the three groups are independently selected from halogens, mono or multicyclic (including halosubstituted) aryls, alkyls, alkenyl compounds and mixtures thereof, for example. In another embodiment, the three groups are selected from $C_1$ to $C_{20}$ alkenyls, $C_1$ to $C_{20}$ alkyls, $C_1$ to $C_{20}$ alkoxys, $C_3$ to $C_{20}$ aryls and combinations thereof, for example. In yet another embodiment, the three groups are selected from the group highly halogenated $C_1$ to $C_4$ alkyls, highly halogenated phenyls, and highly halogenated naphthyls and mixtures thereof, for example. By "highly halogenated", it is meant that at least 50% of the hydrogens are replaced by a halogen group selected from fluorine, chlorine and bromine.

Illustrative, not limiting examples of ionic ionizing activators include trialkyl-substituted ammonium salts (e.g., triethylammoniumtetraphenylboron, tripropylammoniumtetraphenylboron, tri(n-butyl)ammoniumtetraphenylboron, trimethylammoniumtetra(p-tolyl)boron, trimethylammoniumtetra(o-tolyl)boron, tributylammoniumtetra(pentafluorophenyl)boron, tripropylammoniumtetra(o,p-dimethylphenyl)boron, tributylammoniumtetra(m,m-dimethylphenyl)boron, tributylammoniumtetra(p-tri-fluoromethylphenyl)boron, tributylammoniumtetra(pentafluorophenyl)boron and tri(n-butyl)ammoniumtetra(o-tolyl)boron), N,N-dialkylanilinium salts (e.g., N,N-dimethylaniliniumtetraphenylboron, N,N-diethylaniliniumtetraphenylboron and N,N-2,4,6-pentamethylaniliniumtetraphenylboron), dialkyl ammonium salts (e.g., diisopropylammoniumtetrapentafluorophenylboron and dicyclohexylammoniumtetraphenylboron), triaryl phosphonium salts (e.g., triphenylphosphoniumtetraphenylboron, trimethylphenylphosphoniumtetraphenylboron and tridimethylphenylphosphoniumtetraphenylboron) and their aluminum equivalents, for example.

In yet another embodiment, an alkylaluminum compound may be used in conjunction with a heterocyclic compound. The ring of the heterocyclic compound may include at least one nitrogen, oxygen, and/or sulfur atom, and includes at least one nitrogen atom in one embodiment. The heterocyclic compound includes 4 or more ring members in one embodiment, and 5 or more ring members in another embodiment, for example.

The heterocyclic compound for use as an activator with an alkylaluminum compound may be unsubstituted or substituted with one or a combination of substituent groups. Examples of suitable substituents include halogens, alkyls, alkenyls or alkynyl radicals, cycloalkyl radicals, aryl radicals, aryl substituted alkyl radicals, acyl radicals, aroyl radicals, alkoxy radicals, aryloxy radicals, alkylthio radicals, dialkylamino radicals, alkoxycarbonyl radicals, aryloxycarbonyl radicals, carbomoyl radicals, alkyl- or dialkyl-carbamoyl radicals, acyloxy radicals, acylamino radicals, aroylamino radicals, straight, branched or cyclic, alkylene radicals or any combination thereof, for example.

Non-limiting examples of hydrocarbon substituents include methyl, ethyl, propyl, butyl, pentyl, hexyl, cyclopentyl, cyclohexyl, benzyl, phenyl, fluoromethyl, fluoroethyl, difluoroethyl, iodopropyl, bromohexyl or chlorobenzyl, for example.

Non-limiting examples of heterocyclic compounds utilized include substituted and unsubstituted pyrroles, imidazoles, pyrazoles, pyrrolines, pyrrolidines, purines, carbazoles, indoles, phenyl indoles, 2,5,-dimethylpyrroles, 3-pentafluorophenylpyrrole, 4,5,6,7-tetrafluoroindole or 3,4-difluoropyrroles, for example.

Combinations of activators are also contemplated by the invention, for example, alumoxanes and ionizing activators in combinations. Other activators include aluminum/boron complexes, perchlorates, periodates and iodates including their hydrates, lithium (2,2'-bisphenyl-ditrimethylsilicate)-4T-HF and silylium salts in combination with a non-coordinating compatible anion, for example. In addition to the compounds listed above, methods of activation, such as using radiation and electro-chemical oxidation are also contemplated as activating methods for the purposes of rendering the neutral metallocene-type catalyst compound or precursor to a metallocene-type cation capable of polymerizing olefins, for example. (See, U.S. Pat. No. 5,849,852, U.S. Pat. No. 5,859,653, U.S. Pat. No. 5,869,723 and WO 98/32775.)

The catalyst may be activated in any manner known to one skilled in the art. For example, the catalyst and activator may be combined in molar ratios of activator to catalyst of from 1000:1 to 0.1:1, or from 300:1 to 1:1, or from 150:1 to 1:1, or from 50:1 to 1:1, or from 10:1 to 0.5:1 or from 3:1 to 0.3:1, for example.

The activators may or may not be associated with or bound to a support, either in association with the catalyst (e.g., metallocene) or separate from the catalyst component, such as described by Gregory G. Hlatky, Heterogeneous Single-Site Catalysts for Olefin Polymerization 100(4) CHEMICAL REVIEWS 1347-1374 (2000).

Metallocene Catalysts may be supported or unsupported. Typical support materials may include talc, inorganic oxides, clays and clay minerals, ion-exchanged layered compounds, diatomaceous earth compounds, zeolites or a resinous support material, such as a polyolefin, for example.

Specific inorganic oxides include silica, alumina, magnesia, titania and zirconia, for example. The inorganic oxides used as support materials may have an average particle size of from 30 microns to 600 microns or from 30 microns to 100 microns, a surface area of from 50 $m^2/g$ to 1,000 $m^2/g$ or from 100 $m^2/g$ to 400 $m^2/g$ and a pore volume of from 0.5 cc/g to 3.5 cc/g or from 0.5 cc/g to 2 cc/g, for example.

Methods for supporting metallocene catalysts are generally known in the art. (See, U.S. Pat. No. 5,643,847, U.S. Pat. No. 9,184,358 and U.S. Pat. No. 9,184,389, which are incorporated by reference herein.)

Polymerization Processes

As indicated elsewhere herein, catalyst systems are used to form polyolefin compositions. Once the catalyst system is prepared, as described above and/or as known to one skilled in the art, a variety of processes may be carried out using that composition. The equipment, process conditions, reactants, additives and other materials used in polymerization processes will vary in a given process, depending on the desired composition and properties of the polymer being formed.

Such processes may include solution phase, gas phase, slurry phase, bulk phase, high pressure processes or combinations thereof, for example.

(See, U.S. Pat. No. 5,525,678, U.S. Pat. No. 6,420,580, U.S. Pat. No. 6,380,328, U.S. Pat. No. 6,359,072, U.S. Pat. No. 6,346,586, U.S. Pat. No. 6,340,730, U.S. Pat. No. 6,339,134, U.S. Pat. No. 6,300,436, U.S. Pat. No. 6,274,684, U.S. Pat. No. 6,271,323, U.S. Pat. No. 6,248,845, U.S. Pat. No. 6,245,868, U.S. Pat. No. 6,245,705, U.S. Pat. No. 6,242,545, U.S. Pat. No. 6,211,105, U.S. Pat. No. 6,207,606, U.S. Pat. No. 6,180,735 and U.S. Pat. No. 6,147,173, which are incorporated by reference herein.)

In certain embodiments, the processes described above generally include polymerizing olefin monomers to form polymers. The olefin monomers may include $C_2$ to $C_{30}$ olefin monomers, or $C_2$ to $C_{12}$ olefin monomers (e.g., ethylene, propylene, butene, pentene, methylpentene, hexene, octene and decene), for example. Other monomers include ethylenically unsaturated monomers, $C_4$ to $C_{18}$ diolefins, conjugated or nonconjugated dienes, polyenes, vinyl monomers and cyclic olefins, for example. Non-limiting examples of other monomers may include norbornene, nobornadiene, isobutylene, isoprene, vinylbenzocyclobutane, sytrene, alkyl substituted styrene, ethylidene norbornene, dicyclopentadiene and cyclopentene, for example. The formed polymer may include homopolymers, copolymers or terpolymers, for example.

Examples of solution processes are described in U.S. Pat. No. 4,271,060, U.S. Pat. No. 5,001,205, U.S. Pat. No. 5,236,998 and U.S. Pat. No. 5,589,555, which are incorporated by reference herein.

One example of a gas phase polymerization process includes a continuous cycle system, wherein a cycling gas stream (otherwise known as a recycle stream or fluidizing medium) is heated in a reactor by heat of polymerization. The heat is removed from the cycling gas stream in another part of the cycle by a cooling system external to the reactor. The cycling gas stream containing one or more monomers may be continuously cycled through a fluidized bed in the presence of a catalyst under reactive conditions. The cycling gas stream is generally withdrawn from the fluidized bed and recycled back into the reactor. Simultaneously, polymer product may be withdrawn from the reactor and fresh monomer may be added to replace the polymerized monomer. The reactor pressure in a gas phase process may vary from about 100 psig to about 500 psig, or from about 200 psig to about 400 psig or from about 250 psig to about 350 psig, for example. The reactor temperature in a gas phase process may vary from about 30° C. to about 120° C., or from about 60° C. to about 115° C., or from about 70° C. to about 110° C. from about 70° C. to about 95° C., for example. (See, for example, U.S. Pat. No. 4,543,399, U.S. Pat. No. 4,588,790, U.S. Pat. No. 5,028,670, U.S. Pat. No. 5,317,036, U.S. Pat. No. 5,352,749, U.S. Pat. No. 5,405,922, U.S. Pat. No. 5,436,304, U.S. Pat. No. 5,456,471, U.S. Pat. No. 5,462,999, U.S. Pat. No. 5,616,661, U.S. Pat. No. 5,627,242, U.S. Pat. No. 5,665,818, U.S. Pat. No. 5,677,375 and U.S. Pat. No. 5,668,228, which are incorporated by reference herein.)

Slurry phase processes generally include forming a suspension of solid, particulate polymer in a liquid polymerization medium, to which monomers and optionally hydrogen, along with catalyst, are added. The suspension (which may include diluents) may be intermittently or continuously removed from the reactor where the volatile components can be separated from the polymer and recycled, optionally after a distillation, to the reactor. The liquefied diluent employed in the polymerization medium may include a $C_3$ to $C_7$ alkane (e.g., hexane or isobutene), for example. The medium employed is generally liquid under the conditions of polymerization and relatively inert. A bulk phase process is similar to that of a slurry process. However, a process may be a bulk process, a slurry process or a bulk slurry process, for example.

As stated previously, hydrogen may be added to the process for a variety of reasons. For example, hydrogen may be added to increase the melt flow of the resultant polymer or to increase the catalyst activity, for example.

In a specific embodiment, a slurry process or a bulk process may be carried out continuously in one or more loop reactors. The catalyst, as slurry or as a dry free flowing powder, may be injected regularly to the reactor loop, which can itself be filled with circulating slurry of growing polymer particles in a diluent, for example. Optionally, hydrogen may be added to the process, such as for molecular weight control of the resultant polymer. The loop reactor may be maintained at a pressure of from about 27 bar to about 45 bar and a temperature of from about 38° C. to about 121° C., for example. Reaction heat may be removed through the loop wall via any method known to one skilled in the art, such as via a double-jacketed pipe.

Alternatively, other types of polymerization processes may be used, such stirred reactors in series, parallel or combinations thereof, for example. Upon removal from the reactor, the polymer may be passed to a polymer recovery system for further processing, such as addition of additives and/or extrusion, for example.

Polymer Product

The polymers (and blends thereof) formed via the processes described herein may include, but are not limited to, isotactic polypropylene and polypropylene copolymers, for example.

In one embodiment, the polymers are homopolymers of isotactic polypropylene (iPP homopolymer). The isotactic polypropylene generally exhibits an isotacticity of from about 89% to about 99% or at least 95%, for example. Further, as used herein, the term "homopolymer of isotactic polypropylene" refers to a polymer including at least 90 wt. % isotactic polypropylene, or at least 95 wt. % or at least 98 wt. %, for example.

Such iPP homopolymers may further have a narrow molecular weight distribution. For example, the iPP homopolymers may have a molecular weight distribution of from about 1.5 to about 6, or from about 2 to 5 or from about 2.5 to 3.5, for example.

The iPP homopolymers may further have a high melting point. For example, the iPP homopolymers may have a melting point of at least about 140° C., or from about 140° C. to about 175° C. or from about 150° C. to about 170° C., for example.

In addition, the iPP homopolymers may have a melt flow rate of from about 10 dg./min. to about 1000 dg./min. or from about 10 dg./min. to about 250 dg./min., for example. In general, the melt flow rate decreases as the molecular weight increases and vice versa.

It is further contemplated that the iPP homopolymers may have a low content of xylene solubles. For example, the iPP homopolymers may have a xylene solubles content of less than about 3% or less than about 0.7%.

Product Application

The polymers and blends thereof are useful in applications known to one skilled in the art, such as forming operations (e.g., film, sheet, pipe and fiber extrusion and co-extrusion as well as blow molding, injection molding and rotary molding). Films include blown or cast films formed by co-extrusion or by lamination useful as shrink film, cling film, stretch film, sealing films, oriented films, snack packaging, heavy duty bags, grocery sacks, baked and frozen food packaging, medical packaging, industrial liners, and membranes, for example, in food-contact and non-food contact application. Fibers include melt spinning, solution spinning and melt blown fiber operations for use in woven or non-woven form to make filters, diaper fabrics, medical garments and geotextiles, for example. Extruded articles include medical tubing, wire and cable coatings, geomembranes and pond liners, for example. Molded articles include single and multi-layered constructions in the form of bottles, tanks, large hollow articles, rigid food containers and toys, for example.

EXAMPLES

In the following examples, silicon bridged Cp-Flu type ligands were prepared.

Example 1

Ligand A $Me_2Si(3-tBuCp)(3,6-(tBu)_2Flu)$ was prepared by adding BuLi (3.8 ml., 1.6 M, 6.08 mmol) to a solution of $(3,6-tBu)_2$ Flu (1.63 g., 5.86 mmol) in $Et_2O$ (20 ml.) at $-78°$ C. The reaction mixture was allowed to warm to room temperature and then stirred for 4 hours. The reaction mixture was then added to a solution of $Me_2SiCl_2$ (2.5 ml.) in $Et_2O$ (20 ml.) at $-78°$ C. The resultant mixture was allowed to warm to room temperature and then stirred for about 14 hours. The organic layer was evaporated in vacuo, leaving a yellow solid. Ether (20 ml.) was added to the organic layer and the resultant suspension was cooled to $0°$ C. The suspension was then added to tBuCpLi (0.84 g.) The resultant mixture was stirred for 30 min. at room temperature. The organic layer was evaporated in vacuo and purified by column chromatography (silica gel, hexane), leaving a yellow solid with a yield of 2.5 g. (93%).

Example 2

Ligand B $Me_2Si(3-tBuCp)((2,7-Ph_2)(3,6-(tBu)_2)Flu)$ was prepared by adding NBS (2.7 g.) to a solution of $(3,6-(tBu)_2)Flu$ (2.10 g., 7.55 mmol) in $C_4H_6O_3$ (60 ml.) The reaction mixture was stirred for 6 hours at a temperature of from $70°$ C. to $75°$ C. The reaction mixture was then added to $H_2O$, filtered, washed with $H_2O$ and dried, leaving a solid with a yield of 2.71 g. (82%.) A solution of BuLi (1.5 ml., 1.6 M) in hexane (2.4 mmol) was then added to a solution of the reaction mixture (0.927 g., 2.14 mmol) in $Et_2O$ (20 ml.) at $-78°$ C. The resultant mixture was allowed to warm to room temperature and then stirred for about 20 hours. The reaction mixture was then added to a solution of $Me_2SiCl_2$. The reaction mixture was then added to tBuCpLi. The resultant mixture was stirred for about 24 hours. The organic layer was quenched and flashed through a silica gel column, leaving a solid with a yield of 90%.

In the following examples, a Cp-Flu type catalyst was prepared.

Example 3

Catalyst A $Me_2Si(3-tBuCp)((3,6-(tBu)_2Flu)ZrCl_2$ Upon purification, Catalyst A was prepared by adding a solution of Ligand A (0.98 g., 2.14 mmol) in either (20 ml.) to a solution of BuLi (2.8 ml., 1.6M) in hexane (4.48 mmol) at $-78°$ C. The reaction mixture was allowed to warm to room temperature and then stirred for 5 hours. The organic layer was evaporated in vacuo. The organic layer was added to $ZrCl_4$ (0.49 g., 2.10 mmol.) Toluene (20 ml.) was then added to the reaction mixture at $-78°$ C. The reaction mixture was allowed to warm to room temperature and then stirred for about 14 hours. The organic layer was evaporated in vacuo, leaving a pink-orange solid.

In the following examples, propylene was polymerized in the presence of silicon bridged Cp-Flu type catalysts.

Example 4

A 10× multi-clave reactor was charged with bulk propylene. Catalyst A (0.3 mg., activated with 1.0 ml of MAO (30% in toluene)) was added to the reactor via a syringe. The homogeneous polymerization was continued for a reaction time of 30 min. at $50°$ C. The polymer was recovered (1.5 g.) in vacuo and the activity, molecular weight, molecular weight distribution, melting temperature and recrystallization temperature were measured, as summarized in Tables 1 and 2 below.

Example 5

A 10× multi-clave reactor was charged with bulk propylene. Catalyst A (0.9 mg., activated with 2.0 ml of MAO (30% in toluene)) was added to the reactor via a syringe. The homogeneous polymerization was continued for a reaction time of 30 min. at $20°$ C. The polymer was recovered (3.0 g.) in vacuo and the activity, molecular weight, molecular weight distribution, melting temperature and recrystallization temperature were measured, as summarized in Tables 1 and 2 below.

Example 6

A 4 liter reactor was charged with bulk propylene. Catalyst A (13 mg., activated with 5.0 ml. of MAO (30% in toluene)) was added to the reactor. The homogenous polymerization was continued for a reaction time of 60 min. at $60°$ C. The polymer was recovered (50 g.) in vacuo and the activity, molecular weight, molecular weight distribution, melt flow, tacticity, recrystallization temperature and melting temperature were measured, as summarized in Tables 1 and 2 below.

Example 7A

A 4 liter reactor was charged with bulk propylene. Catalyst A (11.5 mg., activated with 5.0 ml. of MAO (30% in toluene)) was added to the reactor. In addition, hydrogen (60 ppm) was added to the reactor. The homogenous polymerization was continued for a reaction time of 10 min. at $60°$ C. The polymer was recovered (200 g.) and the activity, molecular weight, molecular weight distribution, melt flow, tacticity, recrystallization temperature and melting temperature were measured, as summarized in Tables 1 and 2 below.

Example 7B

A 4 liter reactor was charged with bulk propylene. Catalyst A (11.5 mg., activated with 5.0 ml. of MAO (30% in toluene)) was added to the reactor. In addition, hydrogen (60 ppm) was added to the reactor. The homogenous polymerization was continued for a reaction time of 10 min. at 60° C. The polymer was recovered (200 g.), extracted with xylene and heptane and the activity, molecular weight, molecular weight distribution, melt flow, tacticity, recrystallization temperature and melting temperature were measured, as summarized in Tables 1 and 2 below. The xylene solubles level was 0.7%, while the heptane insoluble level was 96.8%.

Example 8A

A 4 liter reactor was charged with bulk propylene. Catalyst A (5.5 mg., activated with 3.0 ml. of MAO (30% in toluene)) was added to the reactor. In addition, hydrogen (20 ppm) was added to the reactor. The homogenous polymerization was continued for a reaction time of 30 min. at 60° C. The polymer was recovered (190 g.) and the activity, molecular weight, molecular weight distribution, melt flow, tacticity, recrystallization temperature and melting temperature were measured, as summarized in Tables 1 and 2 below.

Example 8B

A 4 liter reactor was charged with bulk propylene. Catalyst A (5.5 mg., activated with 3.0 ml. of MAO (30% in toluene)) was added to the reactor. In addition, hydrogen (20 ppm) was added to the reactor. The homogenous polymerization was continued for a reaction time of 30 min. at 60° C. The polymer was recovered (190 g.), extracted with xylene and heptane and the activity, molecular weight, molecular weight distribution, melt flow, tacticity, recrystallization temperature and melting temperature were measured, as summarized in Tables 1 and 2 below. The xylene solubles level was 0.8%, while the heptane insoluble level was 96.2%.

Example 9

A 6× parallel reactor system was charged with bulk propylene. Catalyst A (20 mg., supported on silica (2 wt. %)) was slurried and added via a syringe. In addition, hydrogen (60 ppm) was added to the reactor. The polymerization was continued for a reaction time of 30 min. at 60° C. The polymer was recovered (5 g.) in vacuo and the activity, molecular weight, molecular weight distribution, recrystallization temperature and melting temperature were measured, as summarized in Tables 1 and 2 below.

TABLE 2

| Ex. # | $\Delta H_{Recrystallization}$ (J/g) | $\Delta H_{Melt\ \#2}$ (J/g) |
|---|---|---|
| 4 | −94.6 | 68.0 |
| 5 | −83.3 | 97.7 |
| 6 | 93.0 | 97.7 |
| 7A | −102.1 | 103.3 |
| 7B | −100.6 | 93.9 |
| 8A | 98.0 | 102.1 |
| 8B | −97.8 | 88.0 |
| 9 | −99.3 | 102.5 |

Comparative Examples

Example 10

A 10× multi-clave reactor was charged with bulk propylene. Isopropyl(3-tBu-5-Me-Cp)(Flu)ZrCl$_2$ (0.5 mg., activated with 1.0 ml of MAO (30% in tolulene)) was added to the reactor. The homogeneous polymerization was continued for a reaction time of 30 min. at 60° C. The polymer was recovered (1.5 g.) in vacuo and the activity, molecular weight, molecular weight distribution, melting temperature and recrystallization temperature were measured, as summarized in Tables 3 and 4 below.

Example 11

A 6× parallel reactor system was charged with bulk propylene. Isopropyl(3-tBu-5-Me-Cp)(Flu)ZrCl$_2$ (10 mg., supported on silica/MAO (2 wt. %)) was slurried and added to the reactor. In addition, hydrogen (60 ppm) was added to the reactor. The polymerization was continued for a reaction time of 30 min. at 60° C. The polymer was recovered (26 g.) in vacuo and the activity, molecular weight, molecular weight distribution, recrystallization temperature and melting temperature were measured, as summarized in Tables 3 and 4 below.

Example 12

A 10× multi-clave reactor was charged with bulk propylene. 1,1-ethyl(3-tBuCp)(3,6-(tBu)$_2$Flu)ZrCl$_2$ (0.2 mg., acti-

TABLE 1

| Ex. # | Activity (g/g/h) | $T_m$ (° C.) | Mw/1000 | Mw/Mn | Mz/Mw | MF (dg./min.) | Tacticity (%) | $T_c$ (° C.) |
|---|---|---|---|---|---|---|---|---|
| 4 | 6,600 | 170.4 | 460.9 | 4.6 | 2.7 | | 95.7 | 128.3 |
| 5 | 3,300 | 167.0 | 402.3 | | | | 95.7 | 111.9 |
| 6 | 3,460 | 156.6 | 220.4 | 2.9 | 2.0 | 10.5 | 96.6 | 110.6 |
| 7A | 104,140 | 158.9 | 97.3 | 3.6 | 2.6 | 240 | 96.7 | 116.6 |
| 7B | | 158.4 | 102.8 | 2.8 | 2.3 | | 97.1 | 102.8 |
| 8A | 69,100 | 156.2 | 105.6 | 2.4 | 1.9 | 154 | 96.9 | 109.8 |
| 8B | | 159.0 | 111.7 | 2.4 | 2.0 | | 97.2 | 115.0 |
| 9 | 500 | 151.7 | 35.8 | 3.4 | | | 95 | 112.0 | vated with 1.0 ml of MAO (30% in toluluene)) was added to the reactor. The homogeneous polymerization was continued for a reaction time of 30 min. at 60° C. The polymer was recovered (1.0 g.) in vacuo and the activity, molecular weight, molecular weight distribution, melting temperature and recrystallization temperature were measured, as summarized in Tables 3 and 4 below.

Example 13

A commercial sample of isotactic polypropylene formed with Ziegler-Natta catalyst was analyzed for the activity, molecular weight, molecular weight distribution, melt flow, tacticity, recrystallization temperature and melting temperature, as summarized in Tables 3 and 4 below.

TABLE 3

| Ex. # | $T_m$ (° C.) | Mw/1000 | Mw/Mn | Mz/Mw | Tacticity (%) | $T_c$ (° C.) |
|---|---|---|---|---|---|---|
| 10 | 148.7 | 370.2 | 5.1 | 2.7 | | 104.6 |
| 11 | 147.5 | 149.4 | 2.7 | 2.3 | 90.5 | 105.3 |
| 12 | 153.7 | 160.0 | 3.6 | 2.0 | | 110.6 |
| 13 | 161.0 | | | | | 111.9 |

TABLE 4

| Ex. # | $\Delta H_{Recrystallization}$ (J/g) | $\Delta H_{Melt\ \#2}$ (J/g) |
|---|---|---|
| 10 | −80.4 | 51.7 |
| 11 | −80.8 | 81.0 |
| 12 | −92.7 | 76.8 |
| 13 | −102.0 | 99.5 |

Unexpectedly, it has been discovered that propylene polymerization with silicon bridged Cp-Flu type catalysts generally result in isotactic polypropylene having a higher melting point ($T_m$) than isotactic polypropylene formed with carbon bridged Cp-Flu type catalysts. It is expected that the silicon bridge based catalysts result in a polymer having a melting point that is at least about 4% higher than polymers formed with carbon based catalysts, or at least 8%, or at least 10% or at least 15%, for example.

It has further been discovered that the silicon bridged Cp-Flu type catalysts generally result in crystallizaiton enthalpy values and temperatures ($T_c$) that are similar to (or higher than) that achieved with conventional Ziegler-Natta catalysts. For example, the silicon bridged Cp-Flu type catalysts generally produced polypropylene having enthalpies that were at least 10 J/g greater than the comparative examples (e.g., at least 5% difference in crystallinity.)

What is claimed is:

1. An olefin polymerization process comprising:
    introducing propylene monomer to a reaction zone;
    disposing an isospecific metallocene catalyst within the reaction zone, wherein the isospecific metallocene catalyst has the formula:

$(SiR^A{}_2)(CpR^B{}_4)(FluR^C{}_8)MA_n$

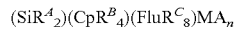

wherein Si is silicon and is a structural bridge between Cp and Flu, Cp is a cyclopentadienyl group, Flu is a fluorenyl group, M is a transition metal, A is a leaving group, n is an integer equal to the valence of M minus 2, $R^A$ is independently selected from alkyls, $R^B$ is independently selected from hydrogen, alkyls or combinations thereof and, wherein one $R^B$ is a tert-butyl in the 3 position, and $R^C$ is independently selected from hydrogen, alkyls, aromatics or combinations thereof, and wherein the Flu is substituted at the 3 and the 6 positions each with a tert-butyl, and at the 2 and the 7 positions;
    contacting the propylene monomer with the isospecific metallocene catalyst to form isotactic polypropylene; and
    recovering the isotactic polypropylene from the reaction zone.

2. The process of claim 1, wherein A is selected from chlorine, bromine, fluorine and combinations thereof.

3. The process of claim 1, wherein M is selected from titanium, zirconium, lanthanum and vanadium.

4. The process of claim 1, wherein the isotactic polypropylene is a homopolymer of polypropylene.

5. The process of claim 4, wherein the isotactic polypropylene exhibits an isotacticity of at least 90%.

6. The process of claim 4, wherein the isotactic polypropylene exhibits an isotacticity of at least 95%.

7. The process of claim 4, wherein the isotactic polypropylene exhibits a melting temperature of greater than about 140° C.

8. The process of claim 4, wherein the isotactic polypropylene exhibits a melting temperature of greater than about 150° C.

9. The process of claim 4, wherein the isotactic polypropylene exhibits a melting temperature of greater than about 160° C.

10. The process of claim 4, wherein the isotactic polypropylene exhibits recrystallization temperature of greater than about 95° C.

11. The process of claim 4, wherein the isotactic polypropylene exhibits enthalpies selected from recrystallization, melting and combination thereof of at least 95 J/g.

12. A polymerization process comprising:
    contacting propylene monomer with an isospecific metallocene catalyst comprising a silicon bridge at a polymerization temperature from 50° C. to 121° C. to form isotactic polypropylene, wherein the isospecific metallocene catalyst has the formula:

$(XR^A{}_2)(CpR^B{}_4)(FluR^C{}_8)MA_n$

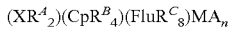

wherein X is a Si structural bridge between Cp and Flu, Cp is a cyclopentadienyl group, Flu is a fluorenyl group, M is a transition metal, A is a leaving group, n is an integer equal to the valence of M minus 2, $R^A$ is independently selected from alkyls, $R^B$ is independently selected from hydrogen, alkyls or combinations thereof and $R^C$ is independently selected from hydrogen, alkyls, aromatics or combinations thereof, and wherein the Flu is substituted at the 3 and the 6 positions each with a tert-butyl, and at the 2 and the 7 positions; and
    recovering the isotactic polypropylene, wherein the isotactic polypropylene has a melting temperature greater than 150° C. and said melting temperature is higher than an isotactic polypropylene polymerized under identical conditions with the isospecific metallocene catalyst comprising a carbon bridge.

13. The process of claim 12, wherein the isotactic polypropylene exhibits a recrystallization temperature that is higher than an isotactic polypropylene polymerized under identical conditions with a Ziegler-Natta catalyst.

14. The process of claim 12, wherein the isotactic polypropylene exhibits a property selected from tacticity, crystallinity or combinations thereof that is higher than an isotactic polypropylene polymerized under identical conditions with an isospecific metallocene catalyst comprising a carbon bridge.

15. The process of claim 12, wherein the isotactic polypropylene exhibits a xylene solubles content of less than about 0.7%.

* * * * *